Oct. 22, 1963 M. N. KOUEITER 3,108,239

HIGH FREQUENCY CAVITY TUNED BY BOTH TELESCOPING SLEEVES AND VOLTAGE VARIABLE DIODE MEANS

Filed May 17, 1960 2 Sheets-Sheet 1

*INVENTOR.*
MICHEL N. KOUEITER

*BY* Lyon & Lyon

ATTORNEYS.

Oct. 22, 1963 M. N. KOUEITER 3,108,239

HIGH FREQUENCY CAVITY TUNED BY BOTH TELESCOPING SLEEVES AND VOLTAGE VARIABLE DIODE MEANS

Filed May 17, 1960 2 Sheets-Sheet 2

*INVENTOR.*
MICHEL N. KOUEITER

*BY* Lyon & Lyon

ATTORNEYS.

United States Patent Office 3,108,239
Patented Oct. 22, 1963

3,108,239
HIGH FREQUENCY CAVITY TUNED BY BOTH TELESCOPING SLEEVES AND VOLTAGE VARIABLE DIODE MEANS

Michel N. Koueiter, 726 N. Heliotrope Drive, Los Angeles, Calif.

Filed May 17, 1960, Ser. No. 29,667
3 Claims. (Cl. 333—83)

The present invention relates to improvements in high frequency cavities and particularly a tunable cavity which may find uses for the same purposes as existing tunable cavities and one of such specific uses is as an expanded scale frequency meter.

Tunable cavities have heretofore been provided in which tuning has been accomplished by adjustment of the physical spacing of elements or by changing physical geometry. In accordance with an important feature of the present invention tuning is accomplished electrically by convenient adjustment of a D.C. voltage source. Such electrical tuning may be accomplished with or without other means for adjusting the physical parameters or geometry of the cavity but it is preferred, as shown herein, that means be provided not only for changing the physical dimensions of the cavity as a coarse adjustment but also the electrical means supplements the same and serves as a fine adjustment.

An object of the present invention is to provide an improved high frequency cavity which is particularly useful as an expanded scale frequency meter.

Another object of the present invention is to provide an improved cavity having the features indicated above.

Another object of the present invention is to provide an improved cavity in which the tuning of the cavity may be calibrated in terms of an accurately measured voltage.

Another object of the present invention is to provide an improved high frequency cavity characterized by its simplicity and ease of adjustment to resonance at different frequencies.

Another object of the present invention is to provide a calibrated attenuator which is insertable between a generator and a load and which may be adjusted to pass more or less energy from one end to the other depending on the tuning or state of resonance of the calibrated attenuator in relationship to the frequency of the energy supplied by the generator or by change in impedance matching of the generator with respect to its load.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
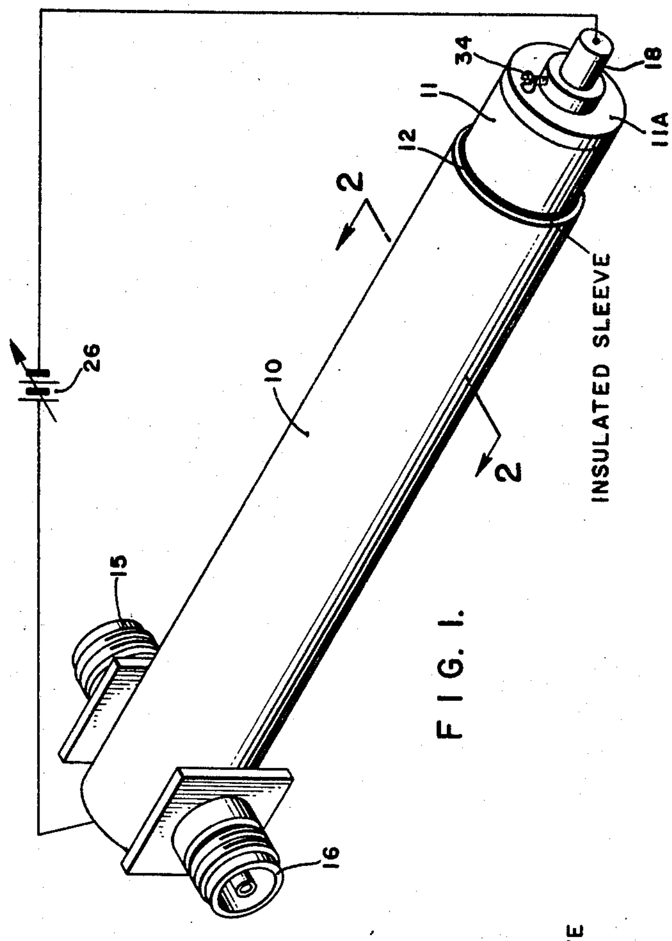
FIGURE 1 is a perspective view illustrating an improved cavity embodying features of the present invention.

Referring to the drawings, the cavity comprises generally an outer metallic tube or sleeve 10 within which is telescopically received the tube or sleeve 11, there being a thin sleeve 12 of insulating material between the two sleeves 10 and 11. One end of the tube 10 is closed by a metallic plug or washer 13 which serves also to support the concentrically disposed rod 14, the tube 10, washer 13 and rod 14 being conductively connected together. Mounted near the closed end of the tube 10 are a pair of coaxial fittings 15 and 16 of conventional construction having their outer conductor members electrically connected to the sleeve 10 at diametrically opposite points thereon with their corresponding insulated center conductors 15A and 16A respectively being connected to probes 15B and 16B. Such probes 15B and 16B extend within the confines of the tube 10 near the closed end thereof and serve as means for introducing and extracting energy from the cavity. The probe 15B may comprise the input probe and the probe 16B may comprise the output probe.

The sleeve 11 has an integrally formed metallic end 11A generally in the form of a washer for slidably engaging a second rod 18 which extends coaxially with respect to the tubes 10 and 11 and which is axially aligned with the other conducting rod 14.

Adjacent ends of the rods 14 and 18 are suitably formed as sockets for mounting and conductively connecting corresponding adjacent conductive terminals 20A and 20B of an encapsulated parametric diode 20 which may, for example, be of the Hughes type GM-1 or SM-1. These sockets for the terminals 20A and 20B may perhaps best be shown as in FIGURE 4 wherein the end of rod 18 has a centrally apertured portion 18A and a series of radial slit portions 18B whereby a series of resilient fingers 18C are formed to resiliently engage the terminal 20B inserted into the centrally apertured portion 18A.

In order to prevent adjacent ends of the sleeves 10 and 11 from electrically engaging each other, there is provided a shouldered insulated washer 22 having the peripheral shouldered portion 22A preventing inadvertent contacting of the adjacent ends of sleeves 10 and 11. It is noted that this insulated washer 22 is located in the region of the parametric diode 20.

Figure 6:
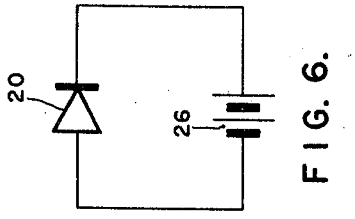
FIGURE 6 is a schematic diagram illustrating the electrical connections between the D.C. source and the paramagnetic diode incorporated in the cavity shown in FIGURE 1.

Means are provided for applying an adjustable D.C. voltage 26 to opposite terminals 20A, 20B of the diode 20 with the polarity as indicated in FIGURE 6 which illustrates that the diode 20 is operated in the so-called back-biased condition, i.e. such that no current flows through the diode 20.

A parametric diode of this character possesses the property that its impedance, i.e. capacitance, changes with changes in the intensity of the voltage source 26 and advantage is taken of this characteristic or property to change the resonant frequency condition of the cavity in which the diode 20 is maintained as described above. For purposes of applying such adjustable D.C. voltage 26 to the diode, there may be provided screws 30 and 31 which are tapped in corresponding rods 14 and 18 and which thus serve as the outer electrodes for the diode 20 to which is connected opposite terminals of the source 26.

Means are also provided for changing to a degree the physical dimensions or geometry of the cavity by adjustment of its length, i.e. by sliding the tube 11 in and out with respect to the outer sleeve 10. This adjustment, which may be characterized as a coarse adjustment, may be effected by loosensing the clamping screw 34 which normally clamps the tube 11 to the rod 18 and by sliding the sleeve 11 in or out with respect to the other sleeve 10, after which the clamping screw 34 is again tightened.

The fine adjustment of the cavity is accomplished by adjustment of the voltage of source 26 after the above-mentioned coarse adjustment has been made. In such case the resonant frequency of the cavity may be calibrated in terms of the voltage applied to the diode 20. Such voltage may normally extend from some finite value up to 5 volts. For these purposes the rod 14 has a length of approximately one quarter wavelength of the operating frequency; and similarly, the rod 18 also has a length approximately equal to one quarter wavelength of the operating frequency. While reference is made to the term one quarter of the wavelength of the operating frequency, it is understood that this term is likewise applicable where the lengths of rods 14 and 18, one or the other, may be an odd integral number of quarter wavelengths.

The diode 20 is preferably of the smallest physical dimensions available since it introduces an impedance or capacitance which is essentially "lumped" in nature as distinct from being a "distributed" impedance or capacitance as exists along the length of a cavity or transmission line.

While for purposes of ease and convenience in mechanical construction the diode 20 has its ends supported on rods 14 and 18 as illustrated, the construction is considered electrically equivalent to the condition wherein the impedance or capacitance exhibited by the diode 20 exists in that region between the ends of tubes 10 and 11, i.e. in the region generally occupied by the shoulder 22A.

In operation of the cavity as, for example, a device for measuring the frequency of high frequency oscillations, a portion of the high frequency energy to be measured is introduced to the probe 15B through the coaxial fitting 15. Suitable monitoring equipment is connected to the output coaxial fitting 16 to respond to energy picked up by the probe 16B. Such monitoring equipment may incorporate, for example, a crystal diode and other associated circuitry for producing a maximum indication corresponding to the resonant condition of the cavity. This maximum condition is achieved by adjustment of the voltage source 26 and such voltage source 26 is calibrated in terms of that frequency which gives a maximum indication on the monitoring equipment connected to the output coaxial fitting 16.

Other uses for such adjustable cavity are clearly suggested to those skilled in the art and the particular use of the same described in some detail above is typical of other uses to which the adjustable cavity may be placed.

Figures 3, 4, 5:
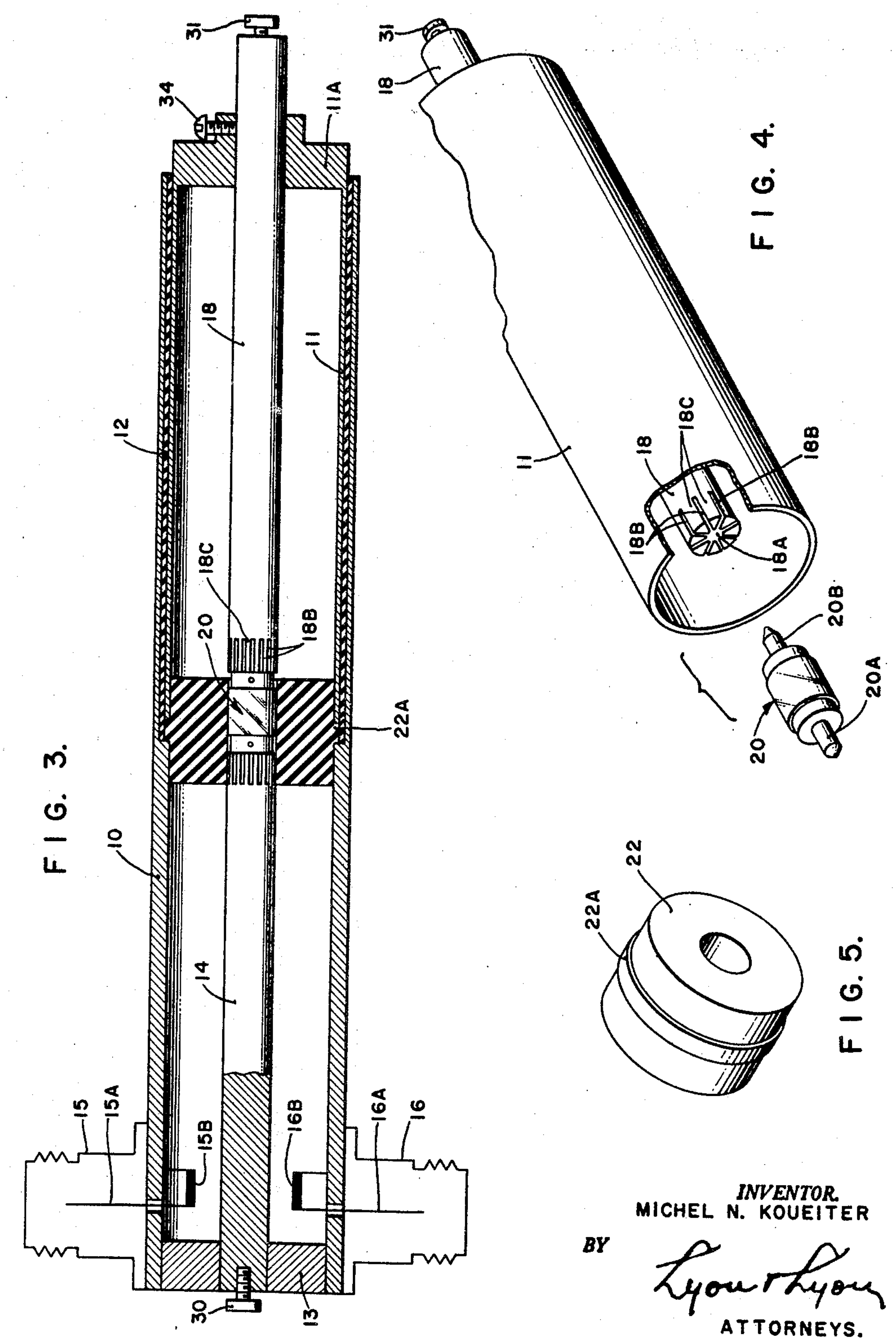
FIGURE 3 is generally a transverse sectional view through the cavity shown in FIGURE 1.
FIGURE 4 is a perspective view, partly in section, of two of the elements comprising the cavity shown in FIGURE 1.
FIGURE 5 is a perspective view of the insulation washer incorporated in the cavity in FIGURE 1.

It will be observed that the probes, as for example the probes 15B and 16B in FIGURE 3, are actually field-current loops having one end thereof connected to the metal tube 10.

With reference to FIGURE 6, it will be noted that the voltage polarities indicated may be different than that illustrated, i.e. will depend on the type of crystal used; for example, when using an N-type crystal like a GM-1 crystal, the same will be connected to the positive end of the battery to be operated with a so-called back or reverse bias while the polarities will be opposite when using a P-type crystal. The parametric diode like the GM-1 or SM-1 are ones of a variety of semiconductor units that can be used to accomplish the same thing. Indeed, other solid state units which exhibit parametric characteristics or qualities, i.e. capacitance inductance or resistance varying with bias may in general be used for this purpose.

It will also be understood that in the arrangement shown in FIGURE 3 a tuning screw can be introduced at some convenient point in the cavity and can be used to accomplish the above-mentioned coarse adjustment previously described as being obtained by adjustment of the inner sleeve 11 with respect to the outer sleeve 10.

It will also be understood that one or more cavities using the same diode or one or more diodes operating in the same cavity or a combination of these can be used to provide a wider frequency range or better accuracy.

It will be observed that the arrangement previously described for obtainance of a high Q (figure of merit) configuration incorporates means for introducing the D.C. bias to the diode for the operation previously explained. This particular design described in connection with FIGURE 3 is relatively easy to machine and build although it will be appreciated that other different arrangements, as for example the arrangement now described in connection with FIGURE 7, may be used.

Figure 7:
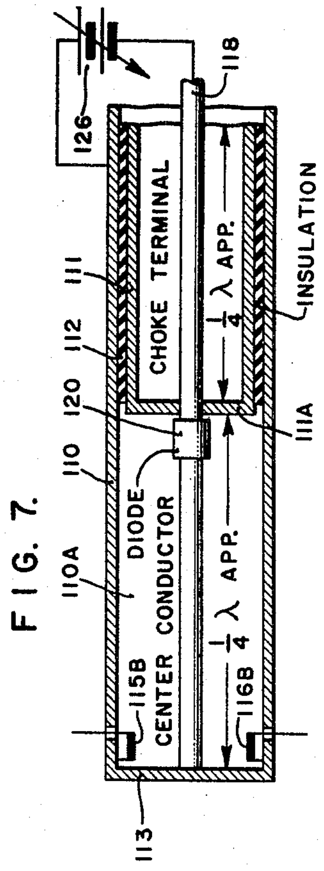
FIGURE 7 illustrates a modified form of the invention.
Figure 2:
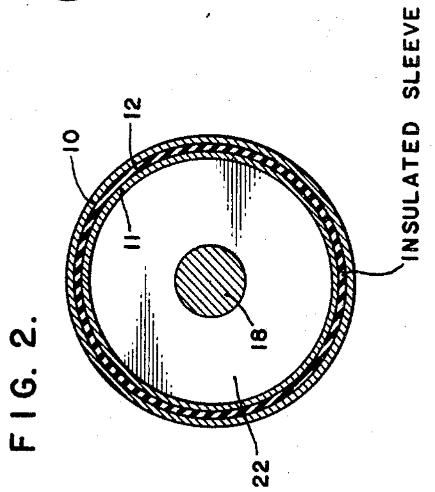
FIGURE 2 is a section taken substantially on the line 2—2 of FIGURE 1.

In FIGURE 7 the outer sleeve 110, corresponding to the outer sleeve 10 in FIGURE 3, defines a cavity 110A which is bounded at one end by the metal closure 113 and which is bounded at its other end by the circular wall 111A of the inner sleeve 111, the sleeve 111 being insulated from the outer sleeve 110 by a thin-walled tube 112 of insulating material. The diode 120 has one of its ends connected to a point adjacent the wall 111A and the other one of its ends connected to the centrally disposed rod 114 which has its lefthand end electrically connected to the wall or plug 113. The distance between the walls 113 and 111A is approximately one-quarter wavelength of the frequency of the energy introduced into the cavity by the probe 115B. As in FIGURE 3 a pick-up probe 116B also extends in the cavity 110A. An adjustable D.C. bias voltage 126 is connected between the outer sleeve 110 and the centrally disposed rod 118 which has its lefthand end connected to the metal wall 111A of the inner sleeve 111. The inner sleeve 111 cooperates with the outer sleeve 110 to provide a choke termination as indicated, the wall 111A being spaced one-quarter wavelength from the end of sleeve 110 as indicated for providing such a choke termination.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A cavity construction of the character described comprising a first closed-ended sleeve, a second closed-ended sleeve having its open end telescopingly received in the open-ended portion of the first-mentioned sleeve, a sleeve of insulating material between the two sleeves, an insulated washer having a peripheral shouldered portion physically separating the open end of the second-mentioned sleeve from the first-mentioned sleeve, a first rod in the first sleeve extending coaxially of the first sleeve and being electrically connected at the closed end of the first sleeve, a second rod conductively connected to the closed end of the second-mentioned sleeve and extending coaxially thereof, the first and second-mentioned rods being spaced adjacent said shouldered portion of said washer, the opposite ends of said rods each having a socket therein, a parametric diode having corresponding terminals thereof in corresponding ones of said rod sockets, a pair of terminals with corresponding ones thereof being mounted on corresponding ones of said rods, a source of direct current voltage applied to said terminals, a first coaxial fitting on the first-mentioned sleeve, the inner conductor of said coaxial fitting being connected to a probe which extends into the first-mentioned sleeve, a second coaxial fitting mounted on said first sleeve, an output probe in said first sleeve and being connected to the inner conductor of the second coaxial fitting.

2. A construction as set forth in claim 1 in which the second-mentioned rod is releasably secured to the closed end of the second sleeve.

3. A construction as set forth in claim 1 in which the length of the rods disposed within corresponding sleeves are approximately one quarter of the wavelength of the operating frequency.

(References on following page)

References Cited in the file of this patent

UNITED STATES PATENTS

| | | |
|---|---|---|
| 2,408,420 | Ginzton | Oct. 1, 1946 |
| 2,572,232 | Wolfe | Oct. 23, 1951 |
| 2,583,027 | Taylor | Jan. 22, 1952 |
| 2,752,495 | Krogen | June 26, 1956 |
| 2,884,607 | Uhlir | Apr. 28, 1959 |
| 2,934,658 | Lewis | Apr. 26, 1960 |
| 3,036,281 | Hilliard | May 22, 1962 |
| 3,039,064 | Dain | June 12, 1962 |
| 3,067,394 | Zimmerman et al. | Dec. 4, 1962 |